United States Patent [19]
Nielsen et al.

[11] Patent Number: 5,343,763
[45] Date of Patent: Sep. 6, 1994

[54] FLOW INDICATOR IMPELLER MODULE

[75] Inventors: John C. Nielsen, Racine; Mark A. Loeffler, Kenosha; Dominic A. Cariello, Racine, all of Wis.

[73] Assignee: Racine Federated Inc., Racine, Wis.

[21] Appl. No.: 899,641

[22] Filed: Jun. 15, 1992

[51] Int. Cl.⁵ .............................................. G01F 1/22
[52] U.S. Cl. ................................. 73/861.58; 73/861.55
[58] Field of Search .................... 73/861.58, 195, 198, 73/861.79, 861.54, 861.57; 116/274, 276

[56] References Cited

U.S. PATENT DOCUMENTS

| | | | |
|---|---|---|---|
| 1,065,974 | 7/1913 | Shaffner | 73/861.58 |
| 1,385,973 | 7/1921 | Brown | 73/861.58 |
| 1,673,000 | 6/1928 | Fagan | 116/274 |
| 1,756,491 | 4/1930 | Marsh | 116/274 |
| 1,964,784 | 7/1934 | Nelson et al. | 116/274 |
| 2,003,474 | 6/1935 | Schweitzer | 73/861.54 |
| 2,014,691 | 11/1935 | Morgan | 116/274 |
| 2,313,889 | 3/1943 | Porter | 73/861.57 |
| 2,439,614 | 4/1948 | Schramm | 73/861.57 |
| 3,454,085 | 7/1969 | Bostock | 73/195 |
| 3,813,940 | 6/1974 | Sommer | 73/198 |
| 3,910,112 | 10/1975 | Gerlach | 73/210 |
| 4,203,820 | 5/1980 | Wiseman | 73/861.57 |
| 4,389,901 | 6/1983 | Lake | 73/861.58 |
| 4,475,407 | 10/1984 | Kruncos | 73/861.53 |
| 4,515,022 | 5/1985 | Brand | 73/861.79 |
| 4,875,377 | 10/1989 | Robertson | 73/861.02 |
| 4,945,771 | 8/1990 | Ogden | 73/861.58 |
| 5,024,105 | 6/1991 | Tentler et al. | 73/861.58 |

FOREIGN PATENT DOCUMENTS

| | | |
|---|---|---|
| 100393A2 | 2/1984 | European Pat. Off. . |
| 3340715A1 | 5/1985 | Fed. Rep. of Germany . |
| 227234A1 | 9/1985 | Fed. Rep. of Germany . |
| 55-35206 | 3/1980 | Japan . |
| 57-20611 | 2/1982 | Japan . |
| 0839592 | 6/1960 | United Kingdom . |
| 1073859 | 6/1967 | United Kingdom . |

OTHER PUBLICATIONS

2 Kobold catalog pages (undated, unnumbered).

Primary Examiner—Richard E. Chilcot, Jr.
Assistant Examiner—William L. Oen
Attorney, Agent, or Firm—Wood, Phillips, VanSanten, Hoffman & Ertel

[57] ABSTRACT

A fluid flow indicator module 50 for insertion into a transparent conduit 12, the conduit 12 defining a path of a fluid. The fluid flow indicator module 50 has a transparent housing 52 having a fluid inlet 66 and a fluid outlet 75, the housing 52 being insertable into the conduit 12. A structure 54 which provides a visual signal in response to a fluid flow is mounted in the housing 52 in fluid communication with the fluid inlet 66.

18 Claims, 1 Drawing Sheet

2

FLOW INDICATOR IMPELLER MODULE

TECHNICAL FIELD

This application is directed toward fluid flow indicators, and, more particularly, toward a flow indicator impeller module insertable into a transparent conduit of a fluid flow meter.

BACKGROUND OF THE INVENTION

Fluid flow meters are well known in the prior art and include a wide variety of designs, including variable area flow meters, impact plate flow meters, float type flow meters and paddlewheel flow meters. Each of these types of flow meters have a distinct metering assembly but no backup system for indicating whether or not fluid is flowing through the meter in the event the metering assembly fails. The lack of a backup flow indicator is particularly a problem in the event a meter jams in a position showing a metered amount of fluid flow when in fact no fluid is flowing through the meter. This can lead to a situation where an operator is unaware that necessary lubricants are not flowing to a machine and the absence of lubricant can eventually cause serious damage to the machine.

One meter known in the prior art has a paddlewheel visible through a window in the meter housing which is operably associated with a metering scale. However, with such a meter it is possible that the paddlewheel could become jammed indicating an absence of fluid flow when in fact fluid is flowing through the meter. Under these circumstances an operator may be forced to shut down a manufacturing process or a machine while fluid supplies are checked although the real problem lies with the meter.

The present application is directed to overcoming one or more of the problems discussed above.

SUMMARY OF THE INVENTION

A fluid flow indicator module is insertable into a transparent conduit, the conduit defining a path of a fluid. The fluid flow indicator module has a transparent housing having a fluid inlet, the housing being insertable into the conduit. A structure which provides a visual signal in response to a fluid flow is mounted in the housing in fluid communication with the fluid inlet.

Preferably, the visual indicator structure is an impeller rotatable about an axis in response to a fluid flow. The impeller is mounted in the housing with the axis parallel to the path of a fluid upon insertion of the flow indictor into the transparent conduit. The impeller has at least one blade extending radially from the axis. The blade extends a distance such that its distal end is in close proximity to a side wall of the housing. The inlet preferably consists of a plurality of nozzles in a front wall of the housing, the nozzles being equally radially spaced from the rotational axis of the impeller and symmetrically spaced from each other. The combined cross-sectional area of the nozzles is less than the cross-sectional area of the conduit.

Another aspect of the flow indicator impeller module is a fluid flow meter having a conduit with a transparent section defining a path of a fluid. A structure is provided for measuring the volumetric rate of fluid flowing through the conduit. A flow indicator operatively independent of the measuring structure is also provided. The flow indicator includes an impeller rotatable under the influence of a flow of the fluid through the conduit and a structure for mounting the impeller in the transparent section of the conduit. Preferably, the impeller has an axis and the mounting structure mounts the impeller in the conduit with the axis parallel to the path of the fluid.

The impeller module can be readily installed in a fluid conduit and readily replaced should it fail. The module consists of a minimal number of parts, making it simple and inexpensive to manufacture. The distal end of the impeller blade is situated in close proximity to the side wall of the module housing, facilitating its visibility even when opaque fluids flow through the indicator module. Because the axis of the impeller is mounted in parallel to the direction of flow of a fluid through a conduit, the impeller module can readily be inserted in a cylindrical conduit with the distal end of an impeller blade mountable in close proximity to the conduit wall.

A fluid flow meter having the flow indicator has a second mechanism independent of the metering structure for verifying flow of fluid through the meter. The fluid flow indicator module may be readily retrofitted to a fluid flow meter of the type having a transparent conduit. In addition, the module may be readily replaced, if necessary.

DETAILED DESCRIPTION OF THE PREFERRED EMBODIMENT

Figure 1:
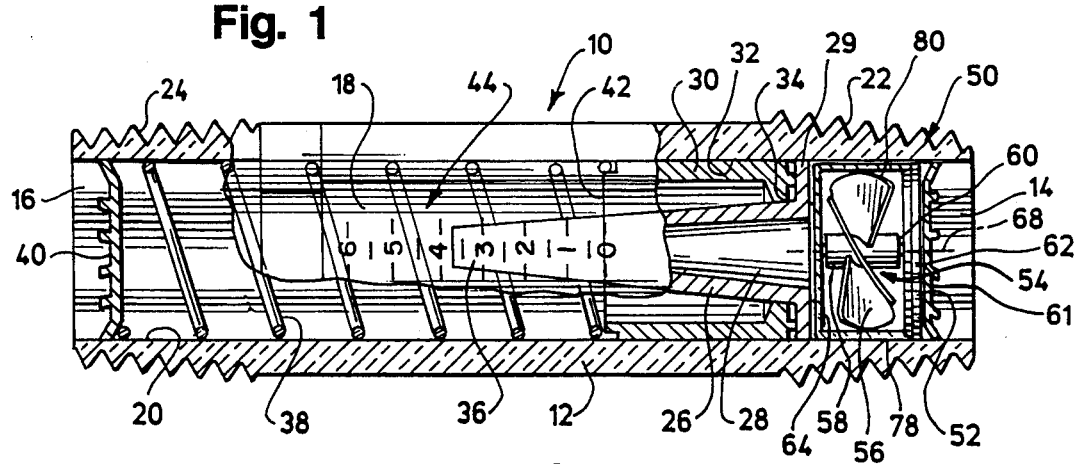
FIG. 1 is a longitudinal section view of a flow meter including the flow indicator impeller module.

A flow meter 10 illustrated in FIG. i is fully described in U.S. Pat. No. 4,389,901, owned by applicants' assignee. The flow meter 10 has a transparent cylindrical conduit 12. The conduit 12 has a fluid inlet 14, fluid outlet 16 and an intermediate chamber 18 extending between the inlet 14 and the outlet 16. The cylindrical conduit 12 has an interior wall 20 extending along its length. The inlet end 14 and the outlet end 16 of the cylindrical conduit 12 have a threaded exterior 22 and 24, respectively, for connecting to fluid flow lines directing fluid flow to and from the meter 10. A conical insert 26 is coaxially mounted in the intermediate chamber 18 of the cylindrical conduit 12. The conical insert 26 has an enlarged base 28 at the inlet 14 side of the cylindrical conduit 12. The enlarged base 28 is joined to the interior wall 20 of the cylindrical conduit by a peripheral flange 29 which may have a plurality of apertures (not shown) providing for passage of fluid through the spider structure 70 of the impeller housing 52 to the piston 30. A cylindrical piston 30 having an outer side wall 32 substantially conforming to the interior wall 20 of the cylindrical conduit 12 has a cylindrical bore 34 coaxial with the cylindrical conduit 12. The cylindrical piston 30 is positioned to ride over the conical insert 26 with the cylindrical bore 34 defining an orifice of increasing cross-sectional area as the piston 30 moves from the enlarged base 28 of the cylindrical insert 26 towards the peak 36 of the conical insert 26. A spring 38 urges the piston 30 toward the enlarged base of the conical insert 26. A spring seat 40 secures the spring 38 in position.

The piston 30 has an indicator line 42 for showing the axial position of the piston 30 in the cylindrical conduit 12. A scale 44 is provided on the cylindrical conduit 12 for indicating the volumetric rate of flow of fluid through the meter 10 as a function of the displacement of the piston 30 away from the inlet 14 by fluid flowing through the meter 10.

At the inlet 14 of the conduit 12 is a fluid flow indicator module 50. The flow indicator module 50 has a cylindrical transparent housing 52, an impeller 54 having a plurality of helical blades 56 extending from an axial hub 58 and an axle 60 extending through the hub 58 mounting the impeller 54 to the housing 52. The indicator module 50 abuts the enlarged base 28 of the conical insert 26 and is held in place longitudinally in the flow meter 10 by a module retainer 61.

Figure 3:
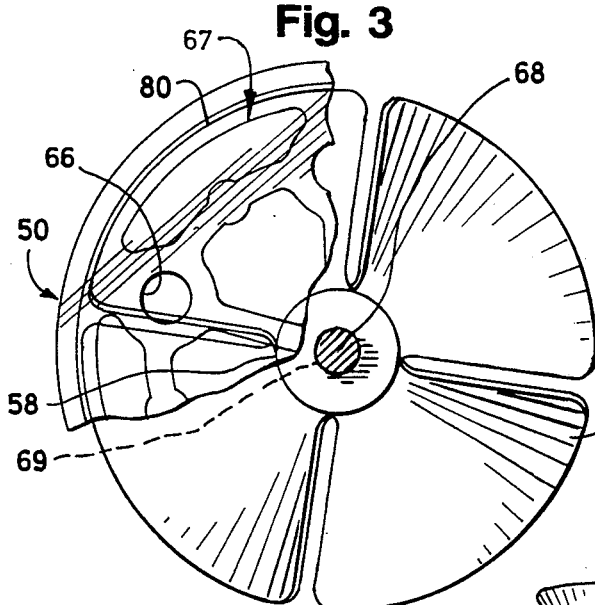
FIG. 3 is a right side elevational view of the flow indicator impeller module shown in FIG. 1.
Figure 2:
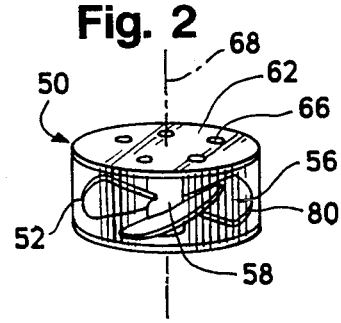
FIG. 2 is a perspective view of the flow indicator impeller module shown in FIG. 1.

The housing 52 has an inlet wall 62 and an outlet wall 64. As best seen in FIGS. 2 and 3, the inlet wall 62 of the housing 52 defines a plurality of nozzles 66 or holes equidistant from the axis 68 of the impeller 54 and symmetrically spaced from each other. A lattice 67 integrally formed in the inlet wall 62 reinforces the inlet wall and resists deflection of the inlet wall as fluid flows through the module 50. The inlet wall 62 also has an axial bore 69 for receiving an end of the axle 60. The outlet wall 64 of the housing 52 is best viewed in FIG. 4. A spider structure 70 has a plurality of legs 72 extending from a central plate 74 defining an outlet 75. At the center of the central plate 74 is a bore 76 for receiving an end of the axle 60.

Figure 4:
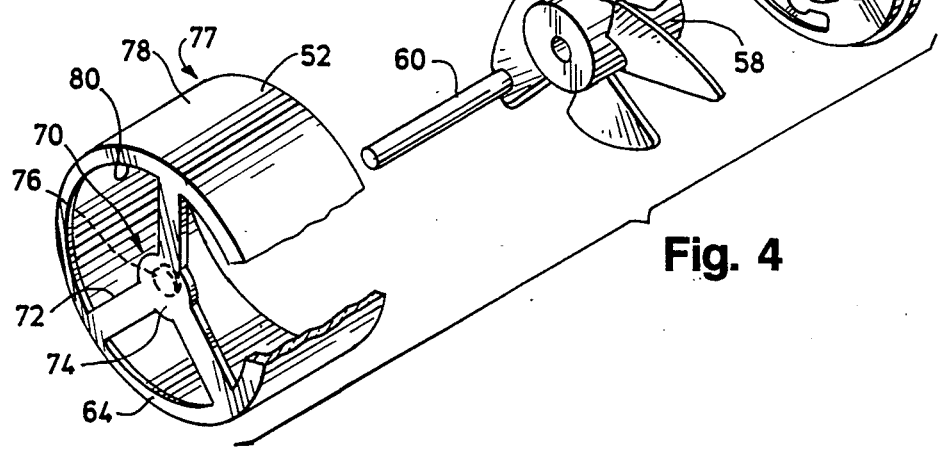
FIG. 4 is an exploded perspective view of the flow indicator impeller module shown in FIG. 1.

A side wall 78 of the cylindrical housing 52 and the spider structure 70 of the cylindrical housing 52 are preferably integrally molded of a clear plastic in the form of a cup 77 (see FIG. 4). The inlet wall 62 of the housing is also preferably molded of clear plastic. Thus, the flow indicator module consists of only four pieces: the integrally molded impeller 54; the axle 60; the integrally molded side wall 78 and spider 70 cup 77 of the housing 52; and the inlet wall 62 of the housing 52.

Preferably, the outer diameter of the side wall 78 of the housing 52 is substantially the same as the inner diameter of the interior wall 20 of the cylindrical conduit 12. In this manner, no fluid may flow between the side wall 78 of the cylindrical housing 52 and the interior wall 20 of the cylindrical conduit 12. The combined cross-sectional area of the nozzles 66 is less than the cross-sectional area of the conduit 12 so that fluid entering the nozzles 66 has a greater velocity than the fluid entering the inlet 14. In this manner, the fluid velocity acting on the impeller blades 56 is increased to assure impeller rotation even under low flow volume conditions.

The blades 56 extend from the hub 58 a distance such that the distal end 80 of the blades 56 are in close proximity to the side wall 78 of the housing 52 (see FIGS. 1 and 2). In this manner, the visibility of the blades 56 is assured even when opaque fluids flow through the flow indicator module 50. The impeller 54 is preferably integrally molded of plastic of a highly visible color, such as a bright orange.

While in the preferred embodiment the flow indicator impeller module is shown as a component in a flow meter, the flow indicator impeller module may also be readily installed in any transparent conduit to indicate fluid flow therethrough. Moreover, the flow indicator impeller may be used with flow meters other than the variable area flow meter 10 described above, including float type flow meters, paddlewheel flow meters and impact plate flow meters.

The impeller module of the present invention consists of a minimal number of parts making it simple and inexpensive to manufacture. The impeller module can be readily retrofitted in a fluid conduit or flow meter and readily replaced should it fail. The blades of the impeller are readily visible even when opaque fluid flows through the module because of the proximity of the ends of the impeller blades to the side wall of the module and the bright color of the impeller blades. Moreover, because the module is configured to mount the impeller with its axis parallel to the axis of the conduit to which it is installed, the module may be readily inserted within the inner diameter of a conduit. The impeller module of the present invention in combination with a flow meter provides an independent structure for verifying fluid flow through the meter. In addition, the fluid flow indicator module may be readily replaced within a meter, if necessary.

We claim:

1. A fluid flow indicator module for insertion within a transparent conduit defining a path of a fluid, the fluid flow indicator module comprising:
   a transparent housing insertable lengthwise within the conduit, the housing having a fluid inlet and a fluid outlet;
   an impeller rotatable about an axis in response to the fluid flow for providing a visual indication of fluid flow; and
   means for mounting the impeller in the housing in fluid communication with the fluid inlet.

2. The fluid flow indicator module of claim 1 wherein the mounting means mounts the impeller for rotation about the axis with the axis parallel to the path of the fluid upon insertion of the flow indicator module into the transparent conduit.

3. The fluid flow indicator module of claim 2 wherein the housing has a peripheral portion substantially corresponding to an inner cross-section of the transparent conduit.

4. The fluid flow indicator module of claim 1 further comprises means for releasably securing the housing longitudinally relative to the transparent conduit.

5. The fluid flow indicator module of claim 4 wherein the releasably securing means comprises a retainer engaging an inner side wall of the transparent conduit.

6. The fluid flow indicator module of claim 1 wherein the transparent conduit has an inner cross-section and the fluid inlet has a cross-sectional area less than the cross-section of the conduit for increasing the velocity of a fluid flowing through the transparent conduit as the fluid flows through the fluid inlet.

7. The fluid flow indicator module of claim 2 wherein the fluid inlet comprises a plurality of nozzles in an inlet wall of the housing equally radially spaced from the axis of the impeller and symmetrically spaced from each other.

8. The fluid flow indicator of claim 2 wherein the conduit has a circular inner cross-section, the housing has a circular front wall having an outer diameter less than the inner diameter of the conduit and a cylindrical side wall and the impeller further comprises at least one blade extending radially from the axis of the impeller, the blade extending a distance radially from the axis such that its distal end is in close proximity to the cylindrical side wall of the housing.

9. The fluid flow indicator of claim 8 wherein the impeller is of a bright color.

10. The fluid flow indicator of claim 2 wherein the mounting means comprises:
an axial hub defining the axis of the impeller;
an axle having first and second ends, the axle being axially inserted in the hub;
an inlet wall of the housing having an inner surface with a bore for receiving the first end of the axle; and
a spider opposite the inlet wall of the housing, the spider having a central plate and at least two legs extending between the central plate and the housing, there being a bore in the plate for receiving the second end of the axle.

11. The fluid flow indicator of claim 10 wherein the spider is integrally molded with the housing.

12. A fluid flow meter comprising:
a conduit having a transparent section defining a path of a flowing fluid;
means within the conduit for measuring the volumetric rate of the fluid flowing through the conduit; and
a flow indicator operatively independent of the measuring means, the flow indicator including an impeller rotatable under the influence of a flow of the fluid through the conduit; and
means for mounting the impeller in the transparent section of the conduit for direct visual observation of rotation of the impeller.

13. A fluid flow meter comprising:
a conduit having a transparent section defining a path of a flowing fluid, the transparent section being cylindrical and the conduit having an inlet and an outlet;
a conical insert having an enlarged base mounted coaxially with the conduit in the conduit, the enlarged base being at the inlet side of the conduit;
a cylindrical piston having an outer surface substantially conforming to an inner cross-section of the conduit, the piston having an orifice coaxial with the conical insert, the cylindrical piston being mounted in the cylindrical conduit with the orifice riding on the conical insert, the piston being urged away from the enlarged base by the flow of fluid into the inlet;
a spring biasing the piston toward the base of the conical insert;
means operatively associated with the piston for displaying the rate of fluid flow associated with the displacement of the piston;
a flow indicator operatively independent of the measuring means, the flow indicator including an impeller rotatable under the influence of a flow of the fluid through the conduit; and
means for mounting the impeller in the transparent section of the conduit.

14. A fluid flow meter comprising:
a conduit having an inlet and an outlet and means for mounting the inlet and the outlet in fluid communication with a flow line, the conduit further including a transparent section defining a path of a fluid flowing through the flow line;
means within the conduit for measuring the volumetric rate of the fluid flowing through the conduit;
a transparent housing inserted into the conduit, the housing having a fluid inlet and a fluid outlet;
means for providing a visual signal within the conduit in response to a fluid flow in the housing operatively independent of the measuring means;
means for mounting the visual signal providing means in the housing in fluid communication with the fluid inlet; and
means for mounting the transparent housing in the transparent section of the conduit.

15. The fluid flow meter of claim 14 wherein the visual signal providing means comprises and impeller rotatable about an axis in response to a fluid flow.

16. The fluid flow meter of claim 14 wherein the housing has a peripheral portion substantially corresponding to an inner cross-section of the transparent conduit.

17. The fluid flow meter of claim 14 wherein the transparent conduit has an inner cross-section and the fluid inlet has a cross-sectional area less than the cross-section of the conduit for increasing the velocity of the fluid flowing through the transparent conduit as the fluid flows through the fluid inlet.

18. A fluid flow meter comprising:
a transparent cylindrical conduit defining a path of a flowing fluid, the transparent cylindrical conduit having an inlet and an outlet;
a conical insert having an enlarged based mounted coaxially with the conduit in the conduit, the enlarged based being at the inlet side of the conduit and the apex of the conical insert being away from the inlet side of the conduit toward the outlet side of the conduit;
a cylindrical piston having an outer surface substantially conforming to an inner cross-section of the conduit, the piston having an orifice coaxial with the conical insert, the cylindrical piston being mounted in the cylindrical conduit with the orifice riding on the conical insert, the piston being urged away from the enlarged base by the flow of fluid into the inlet;
a spring biasing the piston toward the base of the conical insert; and
means operatively associated with the piston for displaying the rate of fluid flow associated with the displacement of the piston;
a transparent housing insertable into the conduit, the housing having a fluid inlet and a fluid outlet;
means for providing a visual signal in response to a fluid flow in the housing operatively independent of the measuring means;
means for mounting the visual signal providing means in the housing in fluid communication with the fluid inlet; and
means for mounting the transparent housing in the transparent section of the conduit.

* * * * *